(12) United States Patent
Yonemura

(10) Patent No.: US 10,633,892 B2
(45) Date of Patent: Apr. 28, 2020

(54) ELECTRONIC DEVICE, DOCK FOR ELECTRONIC DEVICE, AND ELECTRONIC SYSTEM

(71) Applicant: FUJITSU CLIENT COMPUTING LIMITED, Kawasaki-shi, Kanagawa (JP)

(72) Inventor: Masayuki Yonemura, Kawasaki (JP)

(73) Assignee: Fujitsu Client Computing Limited (JP)

( * ) Notice: Subject to any disclaimer, the term of this patent is extended or adjusted under 35 U.S.C. 154(b) by 0 days.

(21) Appl. No.: 16/266,686

(22) Filed: Feb. 4, 2019

(65) Prior Publication Data

US 2019/0178009 A1    Jun. 13, 2019

Related U.S. Application Data

(63) Continuation of application No. PCT/JP2018/020154, filed on May 25, 2018.

(30) Foreign Application Priority Data

Jun. 27, 2017 (JP) ................................ 2017-125581

(51) Int. Cl.
*G06F 1/16* (2006.01)
*H05K 5/00* (2006.01)
(Continued)

(52) U.S. Cl.
CPC ...... *E05B 73/0082* (2013.01); *E05B 65/0067* (2013.01); *G06F 1/16* (2013.01);
(Continued)

(58) Field of Classification Search
CPC .... G06F 1/1616; G06F 1/1632; G06F 1/1656; G06F 1/1679; E05B 73/0082; E05B 73/0005; E05B 65/0067
See application file for complete search history.

(56) References Cited

U.S. PATENT DOCUMENTS 6,212,921 B1 * 4/2001 Knighton ............ E05B 73/0082
248/551
6,389,856 B1 * 5/2002 Watanuki ................ B60R 25/04
70/184

(Continued)

FOREIGN PATENT DOCUMENTS

JP   2001-325040 A   11/2001
JP   2004-234194 A    8/2004
(Continued)

OTHER PUBLICATIONS

International Search Report for Patent Application No. PCT/JP2018/020154, dated Aug. 14, 2018, with translation (4 pages).

*Primary Examiner* — Anthony M Haughton

(74) *Attorney, Agent, or Firm* — Harness, Dickey & Pierce, P.L.C.

(57) ABSTRACT

An electronic device includes a first housing section and a second housing section of which one side is rotatably connected to the first housing section. A locking portion including a recessed portion which is recessed in a first direction is disposed in the first housing section, and a locking member that is movable between a first position and a second position and is urged toward the second position is disposed in the second housing section. A limiting member that is configured to move between the first position and the second position with insertion of an anchoring member and is configured to limit movement of the locking member from the second position to the first position is disposed in the second housing section.

9 Claims, 15 Drawing Sheets

(51) Int. Cl.
*H05K 7/00* (2006.01)
*E05B 73/00* (2006.01)
*G06F 21/88* (2013.01)
*E05B 65/00* (2006.01)

(52) U.S. Cl.
CPC .......... *G06F 1/1616* (2013.01); *G06F 1/1632* (2013.01); *G06F 1/1656* (2013.01); *G06F 1/1679* (2013.01); *G06F 21/88* (2013.01); *E05B 73/0005* (2013.01)

(56) References Cited

U.S. PATENT DOCUMENTS

| | | | | |
|---|---|---|---|---|
| 6,427,499 | B1 * | 8/2002 | Derman | E05B 73/0082 248/551 |
| 6,697,252 | B2 * | 2/2004 | Maeda | E05B 73/0082 248/552 |
| 6,763,690 | B2 * | 7/2004 | Galant | E05B 73/0082 248/553 |
| 7,778,027 | B2 * | 8/2010 | Kitamura | G06F 1/1656 361/679.27 |
| 8,023,252 | B2 * | 9/2011 | Dehaan | E05B 73/0005 361/679.01 |
| 9,398,707 | B2 * | 7/2016 | Chang | H05K 5/0221 |
| 10,282,566 | B2 * | 5/2019 | Moore | E05B 73/0082 |
| 2004/0184228 | A1 | 9/2004 | Minaguchi et al. | |
| 2010/0320884 | A1 | 12/2010 | Shiroishi et al. | |

FOREIGN PATENT DOCUMENTS

| | | |
|---|---|---|
| JP | 2008-065437 A | 3/2008 |
| JP | 2011-002935 A | 1/2011 |
| JP | 2016-167181 A | 9/2016 |
| WO | WO-2008/114371 A1 | 9/2008 |

* cited by examiner

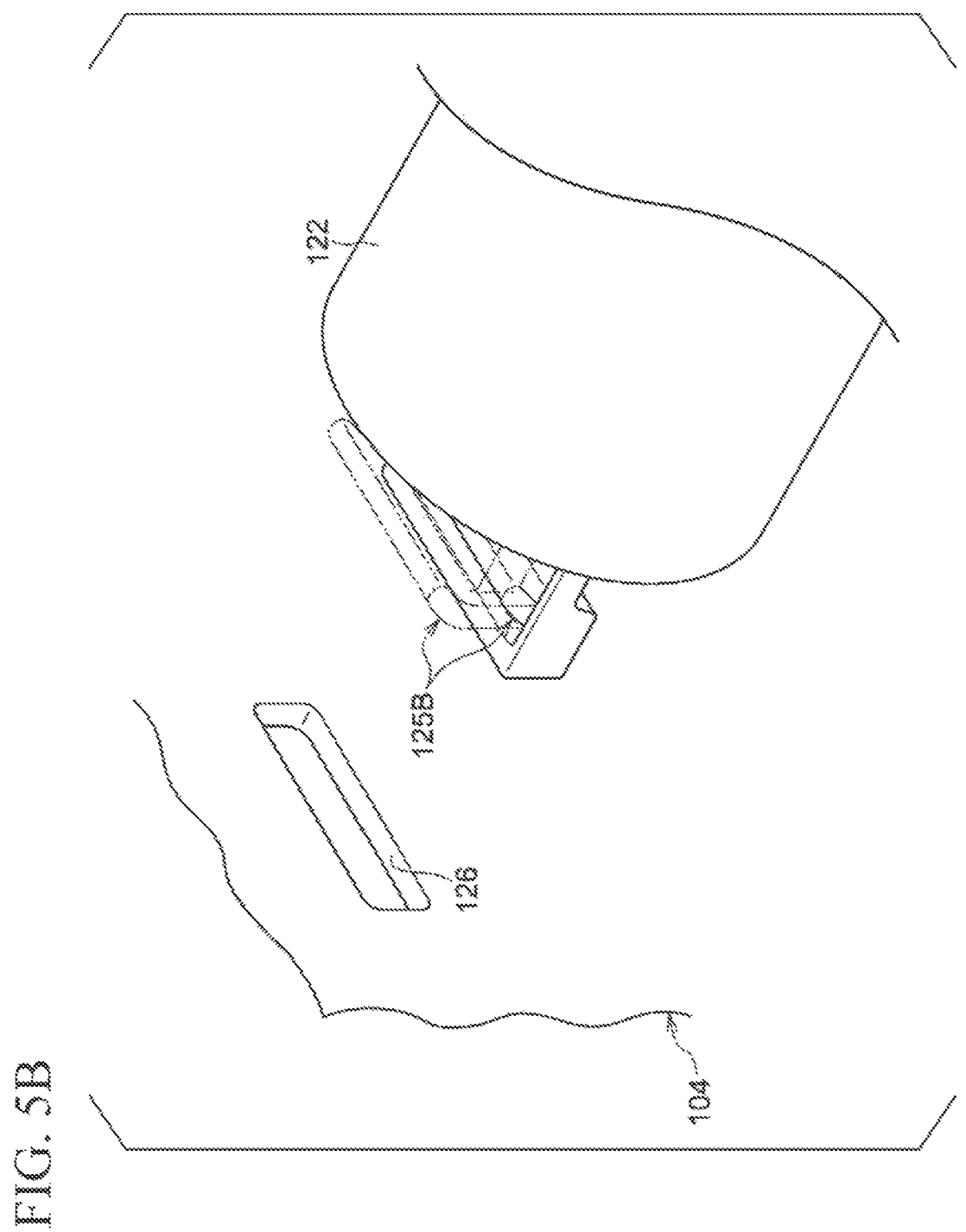

ELECTRONIC DEVICE, DOCK FOR ELECTRONIC DEVICE, AND ELECTRONIC SYSTEM

This application is a continuation application based on a PCT International Application No. PCT/JP2018/020154, filed on May 25, 2018, whose priority is claimed on Japanese Patent Application No. 2017-125581, filed Jun. 27, 2017. The entire content of both the above PCT International Application and the Japanese Application are incorporated herein by reference.

FIELD OF THE INVENTION

Technology disclosed in the present application relates to an electronic device, a dock for an electronic device, and an electronic system.

DESCRIPTION OF RELATED ART

Notebook PCs having a structure in which a lock button is validated when a password number of a dial type key is set and a hook locking a display section and a body section to each other can depart from a hook locking groove to open the display section when the lock button is pressed are known (Japanese Unexamined Patent Application, First Publication No. 2001-325040).

Antitheft devices in which a bar moves, a tip of the bar enters a recessed portion formed in a side part in a housing of a shutter, and the shutter is bound in a closed state when locking of a device body is performed are known (Japanese Unexamined Patent Application, First Publication No. 2008-65347).

Electronic devices in which a rotation-preventing locking hole of a fixing member which protrudes from a display device on a side surface of an upper housing is arranged to align with an antitheft locking hole for connection to an antitheft wire in a state in which the upper housing is closed are known. In these electronic devices, a hook of the antitheft wire can be fitted into the antitheft locking hole through the rotation-preventing locking hole and connected to the antitheft locking hole (PCT International Publication No. WO2008/114371).

SUMMARY OF THE INVENTION

According to the technology disclosed in the present application, an electronic device includes a first housing section and a second housing section of which one side is rotatably connected to the first housing section. A locking portion including a recessed portion which is recessed in a first direction is disposed in the first housing section, and a locking member that is movable between a first position and a second position and is urged toward the second position is disposed in the second housing section. A limiting member that is configured to move between the first position and the second position with insertion of an anchoring member and is configured to limit movement of the locking member from the second position to the first position is disposed in the second housing section.

BRIEF DESCRIPTION OF THE DRAWINGS

FIG. 5B is a partially enlarged perspective view showing another example of the electronic device and the wire lock member according to the first embodiment shown in FIG. 5A.

BRIEF DESCRIPTION OF THE INVENTION

An electronic device according to a first embodiment will be described below in detail with reference to the accompanying drawings.

Figure 1:
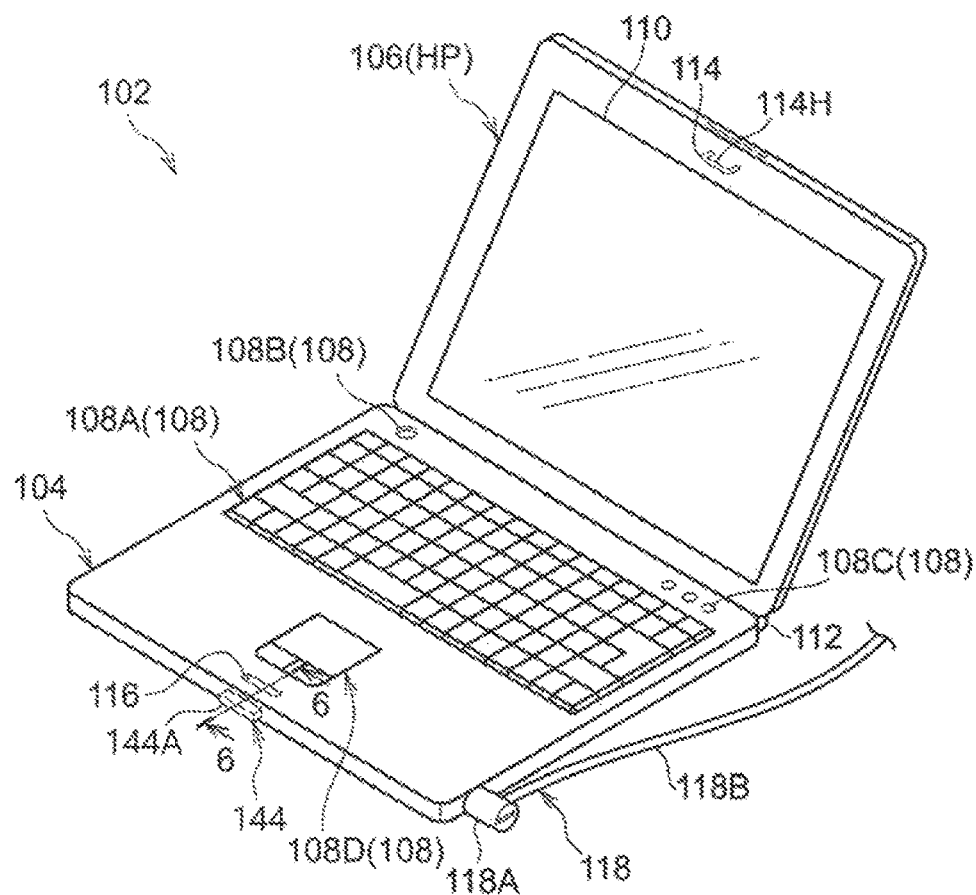
FIG. 1 is a perspective view showing an electronic device and a wire lock member according to a first embodiment in a state in which a display housing is located at an open position.
Figure 2:
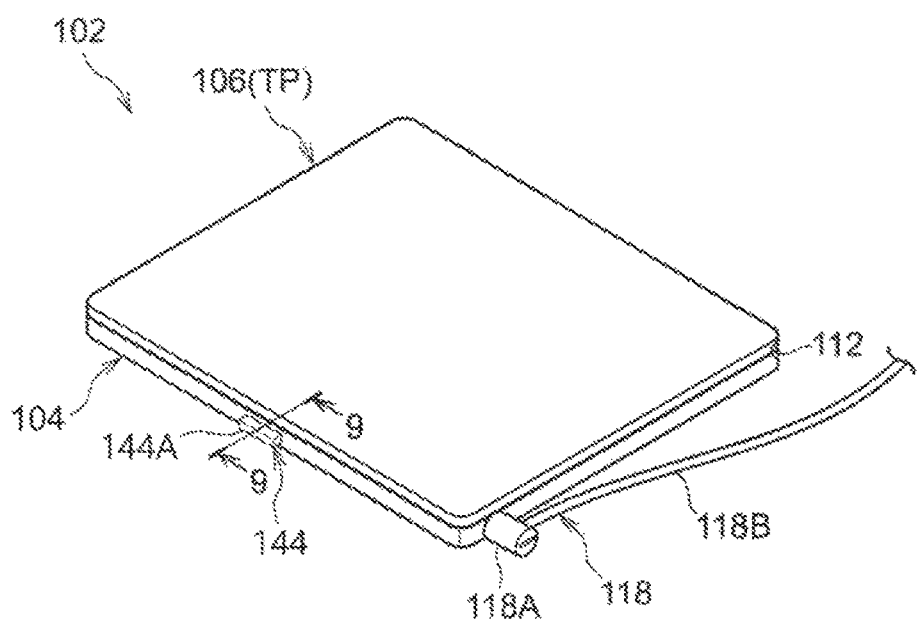
FIG. 2 is a perspective view showing the electronic device and the wire lock member according to the first embodiment in a state in which the display housing is located at a closed position.

As shown in FIGS. 1 and 2, an electronic device 102 according to the first embodiment includes an input section housing 104 and a display housing 106.

An input section 108 is provided in the input section housing 104. Various inputs to the electronic device 102 can be performed through an operation performed on the input section 108. Examples of the input section 108 include a keyboard 108A, a power supply button 108B, an operation switch 108C, and a touch panel 108D. The input section housing 104 is an example of a second housing section.

A display 110 is provided in the display housing 106. A variety of information of the electronic device 102 can be displayed by the display 110. The display housing 106 is an example of a first housing section.

The input section housing 104 and the display housing 106 are rotatably connected to each other with a hinge 112. By this rotation, the display housing 106 can move to an open position HP shown in FIG. 1 and a closed position TP shown in FIG. 2 with respect to the input section housing 104. An electronic device having such a structure may be referred to as a notebook computer. In this embodiment, one side on a deep side of the input section housing 104 is rotatably connected to the display housing 106 with the hinge 112.

The display housing 106 covers the input section 108 at the closed position TP and the display housing 106 functions as a lid for the input section 108. When the display housing 106 is located at the closed position TP, an input operation to the input section 108 is not possible. On the other hand, the display housing 106 opens the input section 108 at the open position HP and thus an input operation to the input section 108 is possible.

In the display housing 106, an engaging piece 114 is provided in a surface (a surface on which the display 110 is provided) facing the input section housing 104 at the closed position TP. The engaging piece 114 is an example of a locking portion.

In the input section housing 104, a recessed receiving portion 116 is provided on a surface (a surface on which the input section 108 is provided) facing the display housing 106 at the closed position TP. The engaging piece 114 is received in the recessed receiving portion 116 when the display housing 106 is located at the closed position TP.

A wire lock member 118 is detachably provided in the input section housing 104. The wire lock member 118 includes a lock member 118A which can be attached to and detached from the input section housing 104 and a wire 118B which extends from the lock member 118A.

Figure 3:
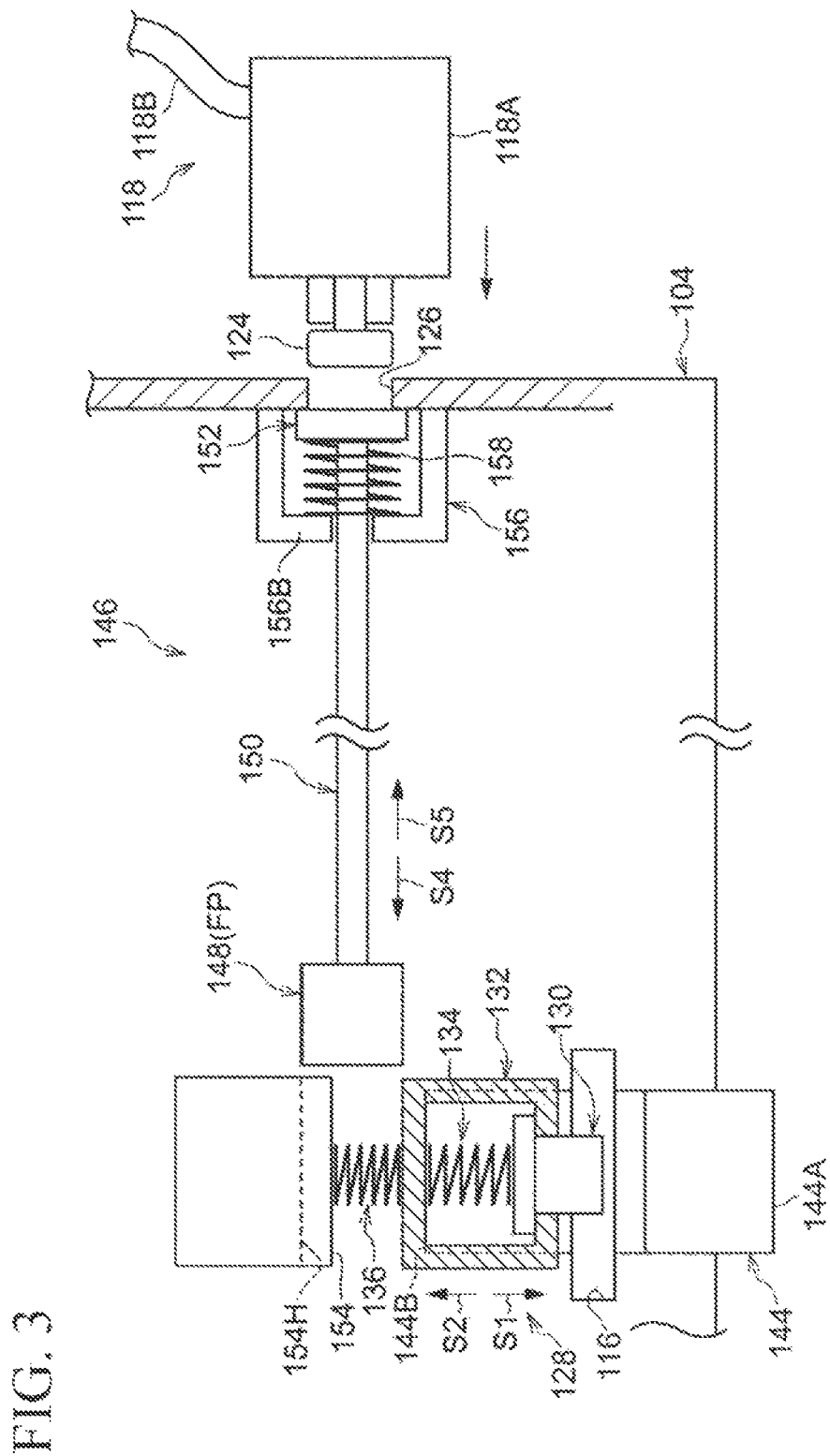
FIG. 3 is a partially exploded plan view showing an internal structure of the electronic device according to the first embodiment along with a part of the wire lock member.
Figure 4:
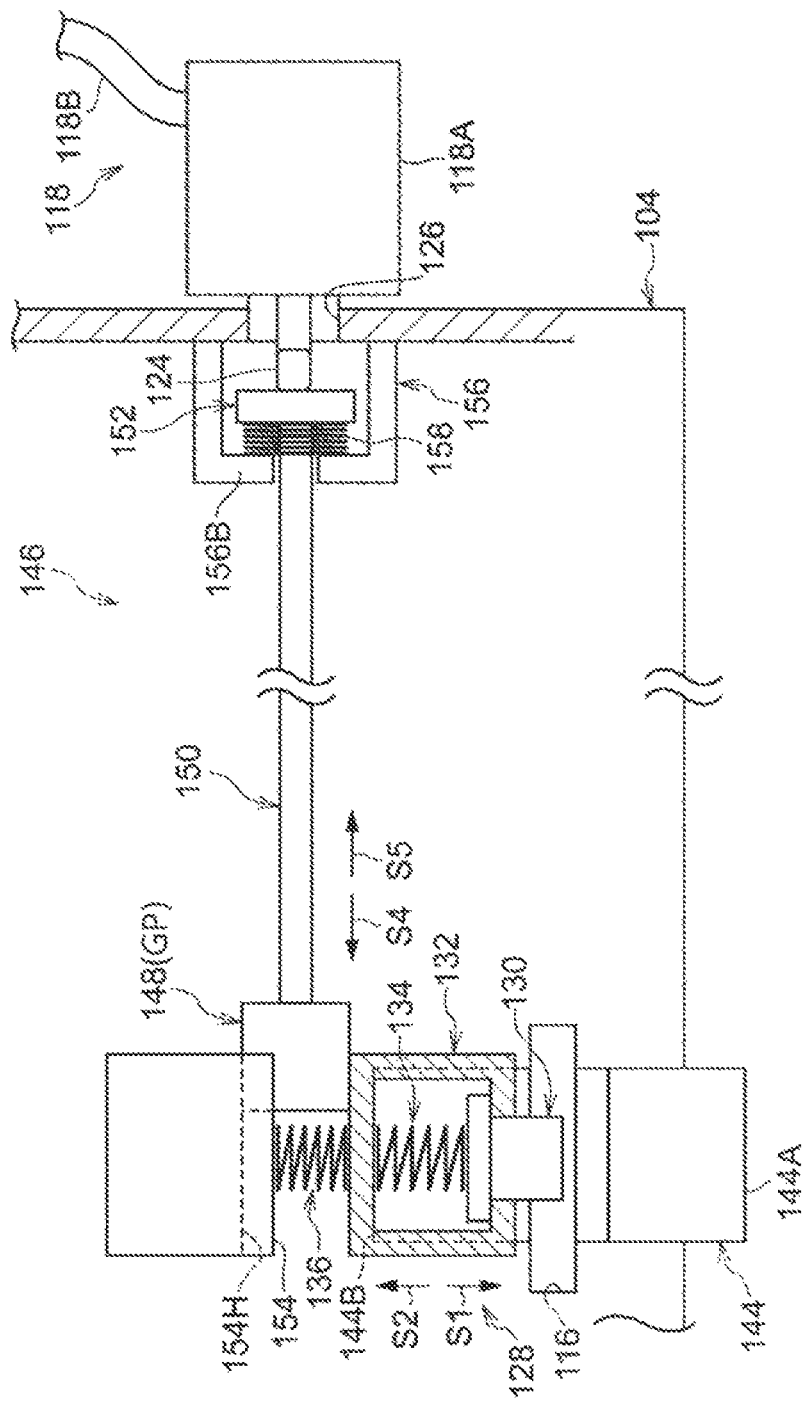
FIG. 4 is a partially exploded plan view showing the internal structure of the electronic device according to the first embodiment along with a part of the wire lock member.

As shown in detail in FIGS. 3 and 4, the lock member 118A in this embodiment includes a key insertion tube 122 and a lock body 124 that protrudes opposite to the key insertion tube 122. When a specific key corresponding to the lock member 118A is inserted into the key insertion tube 122, the lock body 124 can rotate.

Figure 5A:
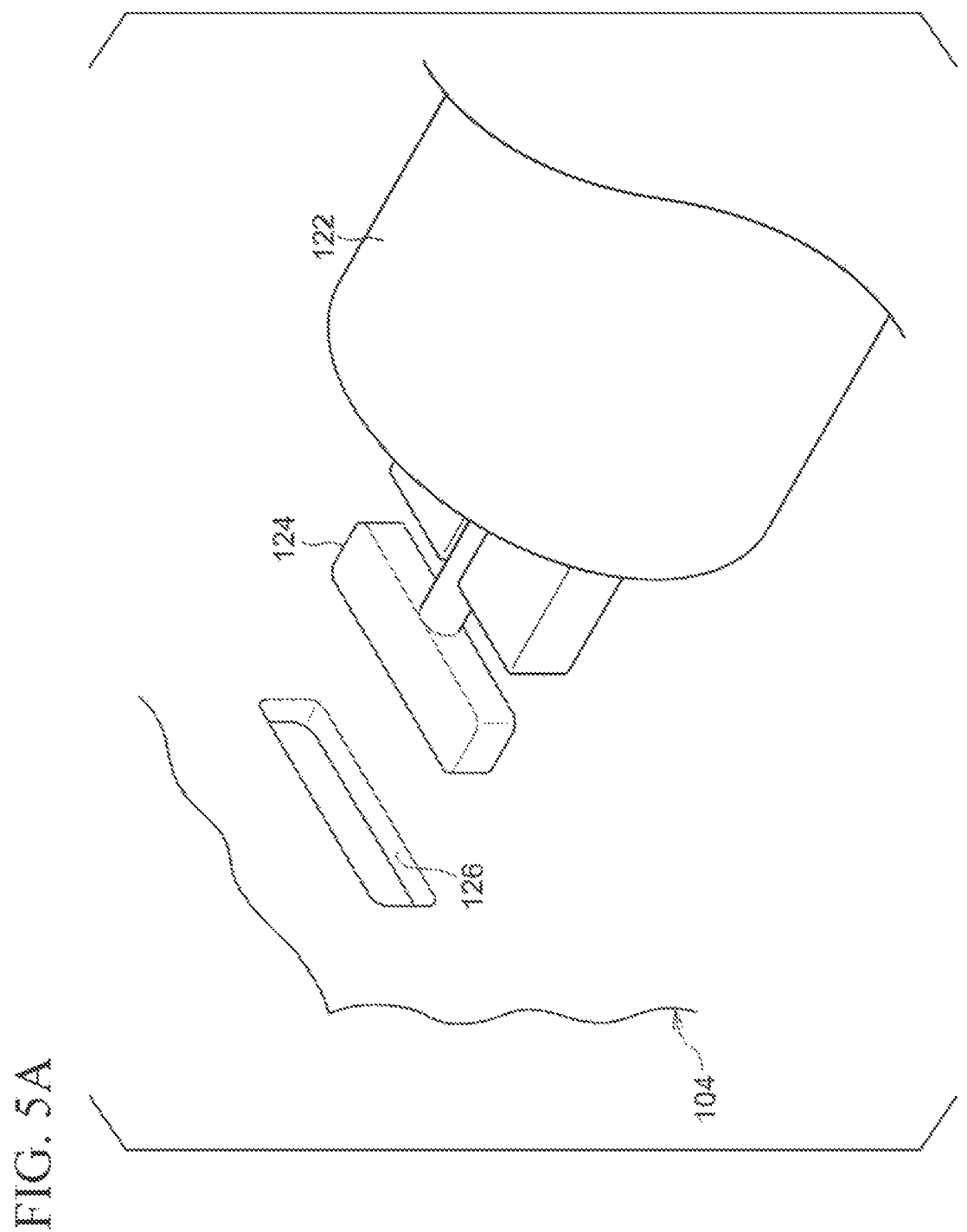
FIG. 5A is a partially enlarged perspective view showing the electronic device and the wire lock member according to the first embodiment.

As shown in FIG. 5A, a long hole 126 into which the lock body 124 can be inserted when the lock body 124 assumes a specific posture is formed in the input section housing 104. When the lock body 124 is rotated, for example, about 90 degrees in a state in which the lock body 124 is inserted into the long hole 126, the lock body 124 is prevented from departing from the long hole 126. By connecting the wire 118B to a member outside the electronic device 102 in this state, the electronic device 102 can be set to a device-anchored state. In the device-anchored state, since the electronic device 102 cannot be taken out of the place to which it is anchored, it is possible to prevent theft of the electronic device 102.

A structure in which the lock body 124 can be rotated, for example, by performing selection of a specific numeral string or letter string on the lock member 118A through operation of a dial or causing a noncontact card to approach the lock member 118A instead of or in addition to insertion of a key into the key insertion tube 122 may be employed. FIG. 5A shows an example of the lock body of which departure is prevented in a state in which the lock body is inserted into the long hole 126, and various structures of lock bodies may be employed instead. For example, a lock body 125 having a structure shown in FIG. 5B may be employed. The lock body 125 includes an expandable piece 125B that expands in a vertical direction in FIG. 5B. By expanding the expandable piece 125B in a state in which it is inserted into the long hole 126, the expandable piece 125B is prevented from departing from the long hole 126.

A locking member 128 is additionally provided in the input section housing 104. The locking member 128 includes an engaging claw 130, a holding box 132, a first spring 134, and a second spring 136.

The holding box 132 is held to be slidable in a direction of an arrow S1 and a direction of an arrow S2 which is opposite thereto in the input section housing 104. The direction of the arrow S1 is defined as a first direction. A sliding direction of the holding box 132 is the same as a sliding direction (which will be described later) of the engaging claw 130. The holding box 132 receives a spring force in the direction of the arrow S1 relative to the input section housing 104 from the second spring 136. A position (see FIGS. 6 to 9) to which the holding box 132 has moved in the direction of the arrow S1 is defined as a protruding position SP, and a position (see FIG. 10) to which the holding box 132 has moved in the direction of the arrow S2 is defined as a retracting position KP.

In the holding box 132, the engaging claw 130 is held to be slidable in the direction of the arrow S1 and the direction of the arrow S2. The engaging claw 130 receives a spring force in the direction of the arrow S1 relative to the holding box 132 from the first spring 134. In the engaging claw 130, a limiting plate 138 is provided in an end portion in the direction of the arrow S2. Sliding of the engaging claw 130 in the direction of the arrow S1 is limited to a predetermined range by causing the limiting plate 138 to come into contact with a limiting wall 140 of the holding box 132.

Figure 6:
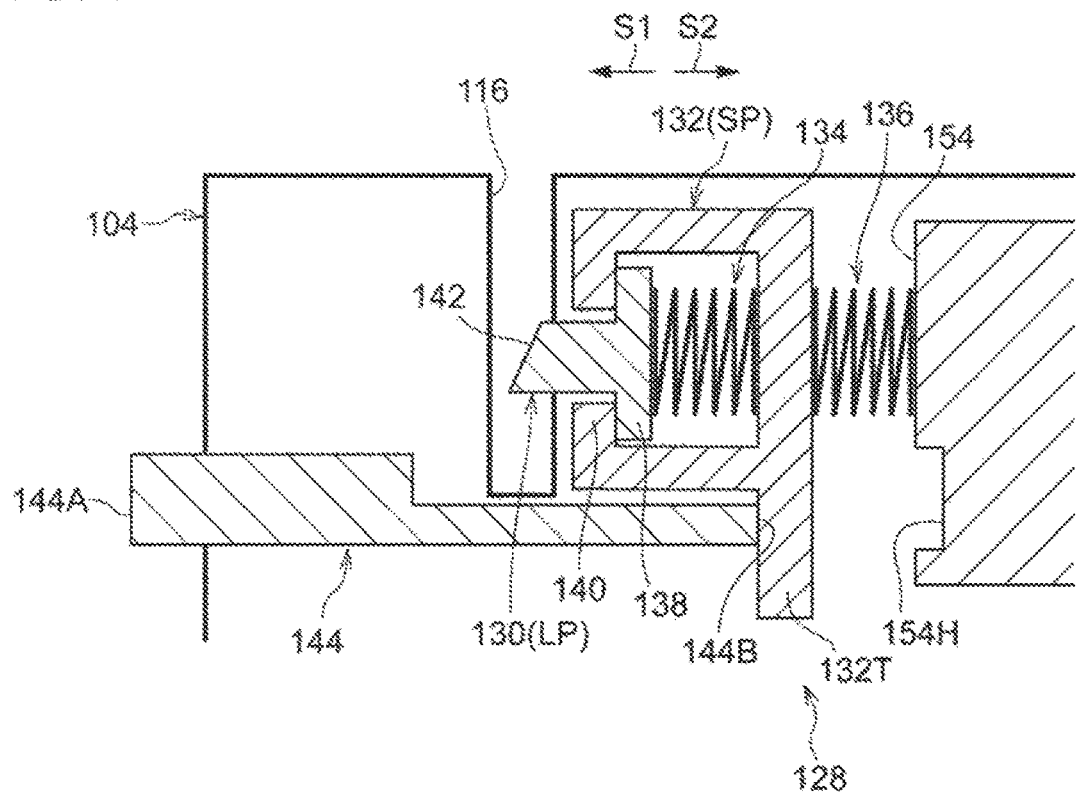
FIG. 6 is a longitudinal sectional view partially showing the internal structure of the electronic device according to the first embodiment at a position of line 6-6 in FIG. 1.
Figure 7:
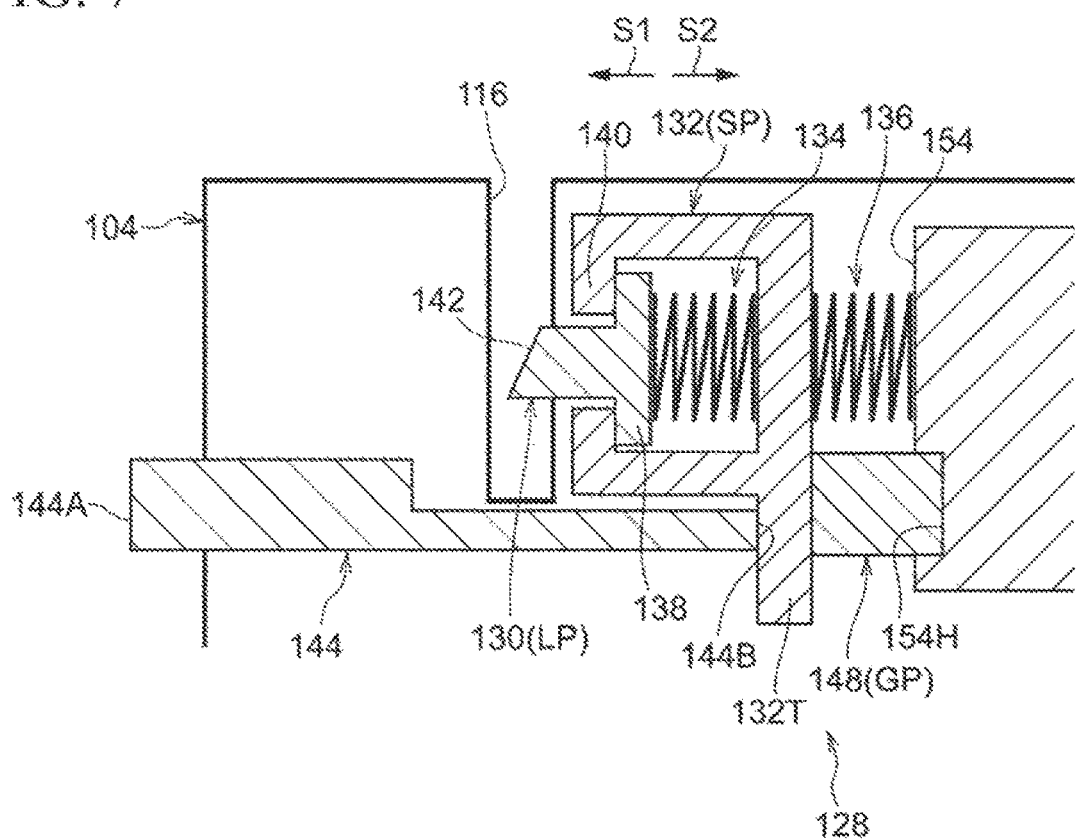
FIG. 7 is a longitudinal sectional view partially showing the internal structure of the electronic device according to the first embodiment at the same position as in FIG. 6.
Figure 9:
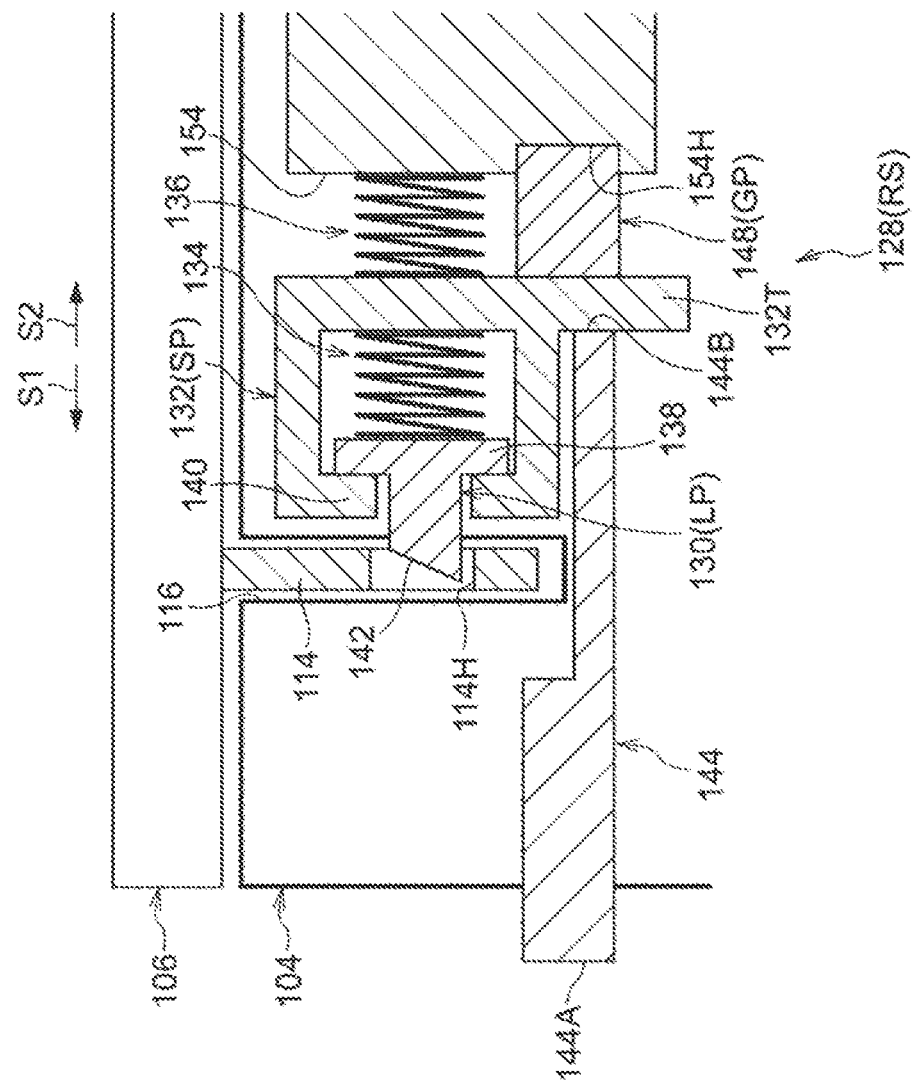
FIG. 9 is a longitudinal sectional view partially showing the internal structure of the electronic device according to the first embodiment at a position of line 9-9 in FIG. 2.

As shown in FIGS. 6, 7, and 9, the engaging claw 130 is located at an engagement position LP in a state in which the holding box 132 and the engaging claw 130 slide in the direction of the arrow S1 and the tip of the engaging claw 130 is located in the recessed receiving portion 116. The tip portion of the engaging claw 130 at the engagement position LP is locked to a locking hole 114H of the engaging piece 114 which is received in the recessed receiving portion 116 as shown in FIG. 9. The locking hole 114H is an example of a recessed portion. Accordingly, the engaging piece 114 is prevented from departing from the recessed receiving portion 116 and the display housing 106 is locked at the closed position TP (see FIG. 2). That is, the locking member 128 is in a locked state RS, and this position is an example of a second position. In the example shown in FIG. 6 or the like, the locking hole 114H penetrates the engaging piece 114 in a thickness direction thereof, but, for example, a recessed portion having a shape which is recessed in the direction of the arrow S1 from the engaging claw 130 side (rather than penetrating the engaging piece 114) may be used as the recessed portion.

On the other hand, in a state in which one or both of the holding box 132 and the engaging claw 130 moves in the direction of the arrow S2 and the engaging claw 130 retracts from the recessed receiving portion 116, that is, in a state in which the engaging claw 130 does not protrude to the recessed receiving portion 116, the engaging claw 130 is located at the disengagement position NP. Accordingly, the engaging piece 114 can be taken out of the recessed receiving portion 116 and the display housing 106 can be rotated to the open position HP (see FIG. 1). That is, the locking member 128 is in the unlocked state NS and this position is an example of a first position.

Figure 8:
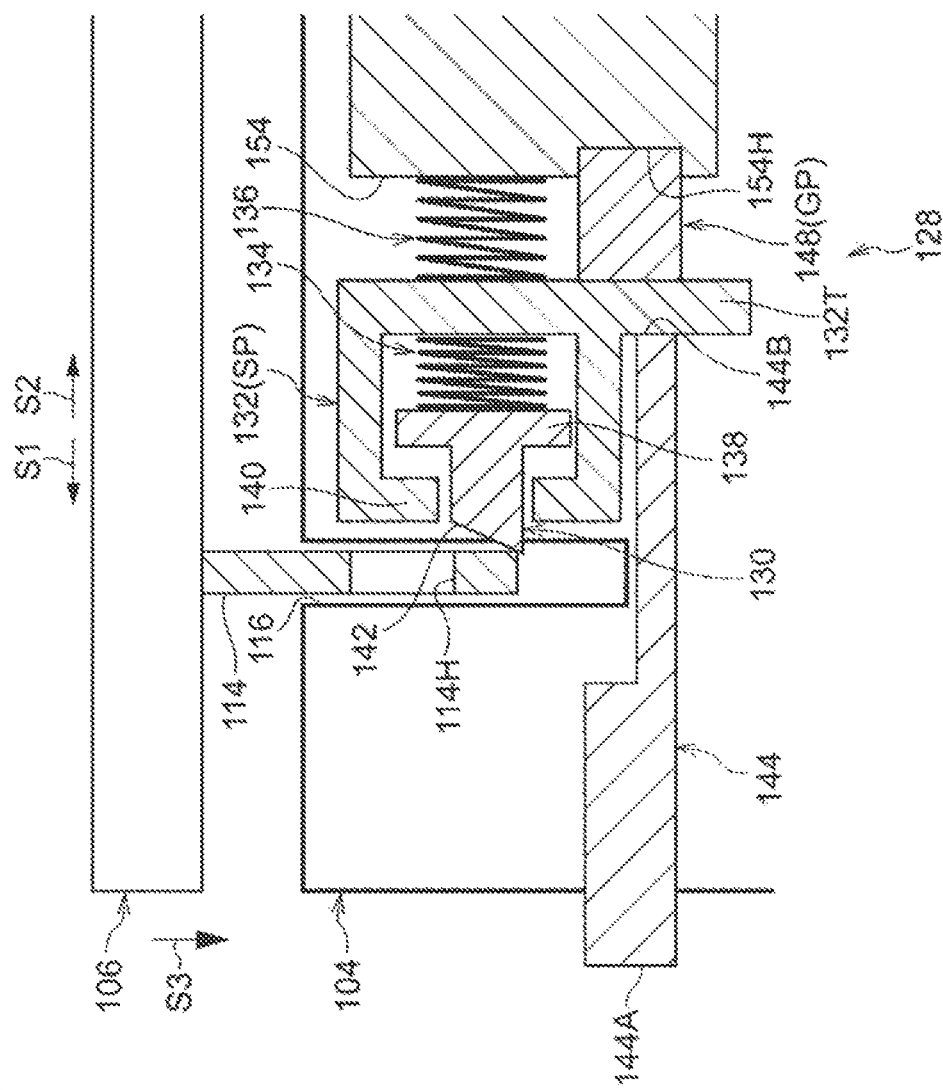
FIG. 8 is a longitudinal sectional view partially showing the internal structure of the electronic device according to the first embodiment at the same position as in FIG. 6.

An inclined surface 142 is formed at the tip of the engaging claw 130. When the engaging piece 114 moves to the recessed receiving portion 116 in a state in which the tip of the engaging claw 130 is located in the recessed receiving portion 116, the engaging piece 114 comes in contact with the inclined surface 142 as shown in FIG. 8. Then, when the inclined surface 142 is pressed in the direction of an arrow S3 by the engaging piece 114, this force is converted into a force in the direction of the arrow S2. Accordingly, the engaging claw 130 moves in the direction of the arrow S2 against the spring force of the first spring 134. As shown in FIG. 9, when the engaging piece 114 moves to a predetermined position in the recessed receiving portion 116, the engaging claw 130 slides in the direction of the arrow S1 with the spring force of the first spring 134 and is fitted to the locking hole 114H.

In the input section housing 104, an unlocking button 144 is further provided to be slidable in the directions of the arrow S1 and S2. One end of the unlocking button 144 is an operation button portion 144A that protrudes from the input section housing 104. The other end of the unlocking button 144 is a contact portion 144B that comes in contact with a contact surface 132T of the holding box 132. By moving the unlocking button 144 in the direction of the arrow S2, the holding box 132 can be pressed by the contact portion 144B to move in the direction of the arrow S2.

As shown in FIGS. 3 and 4, a limiting member 146 is provided in the input section housing 104. The limiting member 146 includes a limiting piece 148, a rod 150, and a pressed plate 152.

The limiting piece 148 can move between a limiting position GP (see FIG. 4) which is located between the holding box 132 and the inner wall 154 of the input section housing 104 and a non-limiting position FP (see FIG. 3) which is retracted from between the holding box 132 and the inner wall 154. The limiting piece 148 moves between the first position and the second position in the locking member 128. The limiting piece 148 comes in contact with the holding box 132 from the direction of the arrow S2 at the limiting position GP and limits movement of the holding box 132 in the direction of the arrow S2. On the other hand, at the non-limiting position FP, the limiting piece 148 is separated from the holding box 132 and movement of the holding box 132 in the direction of the arrow S2 is not limited.

A recessed portion 154H that receives the limiting piece 148 at the limiting position GP is formed in the inner wall 154 of the input section housing 104.

One end of the rod 150 is connected to the limiting piece 148. The pressed plate 152 having a width larger than that of the rod 150 is provided at the other end of the rod 150. In the input section housing 104, a box-shaped holder 156 is provided at a position surrounding the long hole 126. The other end of the rod 150 (a portion including the pressed plate 152) is received and held in the holder 156. As shown in FIG. 4, when the lock body 124 of the wire lock member 118 is inserted into the long hole 126, the rod 150 is pushed in the direction of the arrow S4 by the lock body 124. Accordingly, the limiting piece 148 moves to the limiting position GP via the rod 150.

A third spring 158 is disposed between the pressed plate 152 and a bottom plate 156B of the holder 156, and the third spring 158 applies a spring force in the direction of an arrow S5 which is opposite to the arrow S4 to the pressed plate 152.

As shown in FIG. 3, in a state in which the lock body 124 of the wire lock member 118 is not inserted into the long hole 126, the limiting piece 148 is located at the non-limiting position FP by the spring force of the third spring 158.

Figure 10:
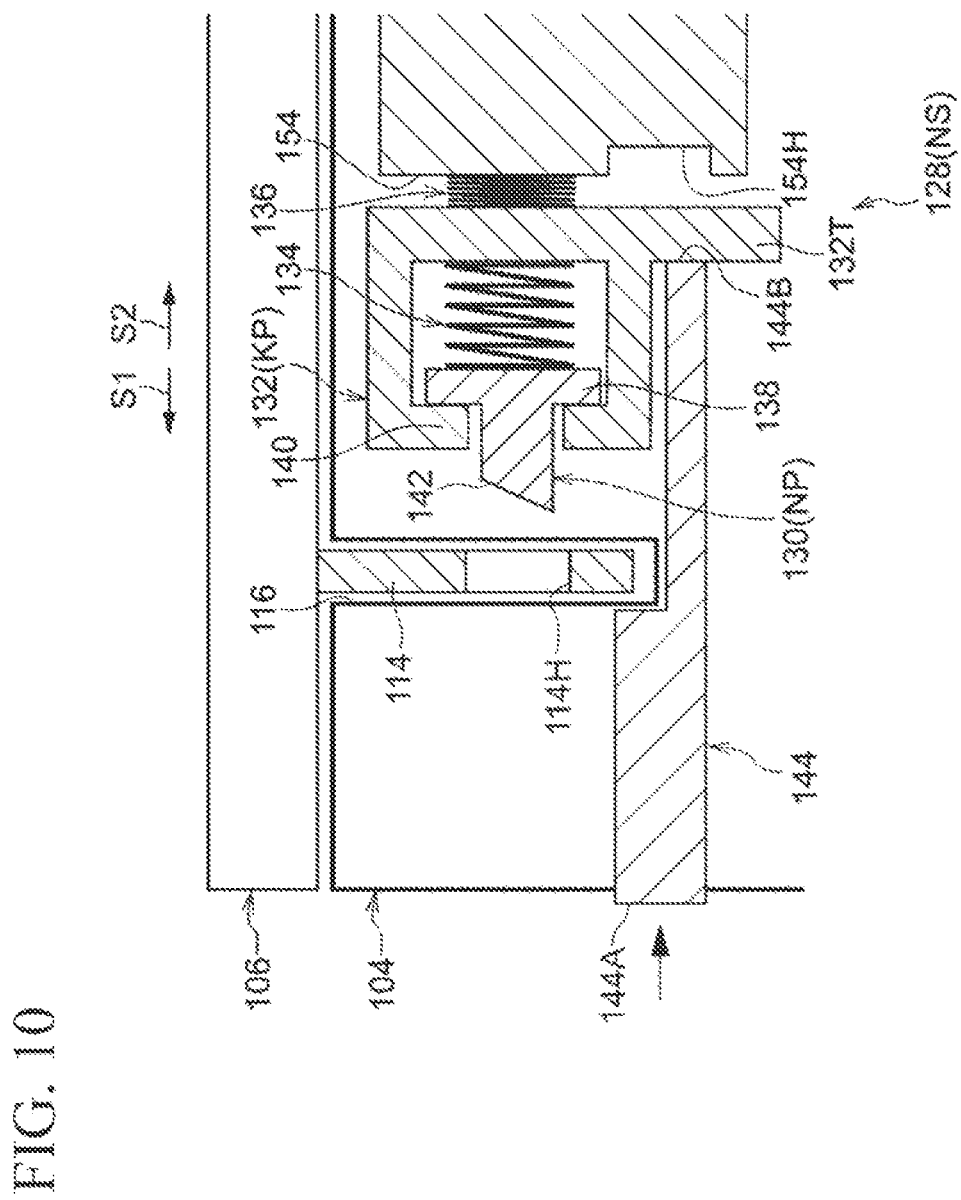
FIG. 10 is a longitudinal sectional view partially showing the internal structure of the electronic device according to the first embodiment at the same position as in FIG. 9.

In the state in which the limiting piece 148 is located at the non-limiting position FP, the holding box 132 can move in the direction of the arrow S2. For example, as shown in FIG. 10, when the unlocking button 144 is pressed in the direction of the arrow S2 in a state in which the engaging claw 130 is located at the engagement position LP, the holding box 132 moves in the direction of the arrow S2 against the spring force of the second spring 136. Accordingly, the engaging claw 130 also moves in the direction of the arrow S2, that is, to the disengagement position NP. Since the engaging claw 130 releases unlocking to the engaging piece 114 at the disengagement position NP, locking of the display housing 106 at the closed position TP is released.

On the other hand, as shown in FIG. 9, in a state in which the limiting piece 148 is located at the limiting position GP, the holding box 132 cannot move in the direction of the arrow S2. In this state, even when the unlocking button 144 is pressed in the direction of the arrow S2, the contact piece 132T of the holding box 132 comes in contact with the limiting piece 148 and thus the holding box 132 does not move in the direction of the arrow S2. The engaging claw 130 does not also move in the direction of the arrow S2 and is held at the engagement position LP.

Operations in this embodiment will be described below.

As shown in FIG. 4, in a state in which the lock body 124 of the wire lock member 118 is inserted into the long hole 126 of the input section housing 104, the limiting piece 148 is located at the limiting position GP. As shown in FIG. 7, since the limiting piece 148 comes in contact with the holding box 132 in the direction of the arrow S2, the holding box 132 cannot move in the direction of the arrow S2. Since the unlocking button 144 comes in contact with the holding box 132 in the direction of the arrow S1, the holding box 132 cannot move in the direction of the arrow S1 and is located at the protruding position SP. The engaging claw 130 is located at the engagement position LP with the spring force of the first spring 134.

Here, when the display housing 106 is rotated from the open position HP (see FIG. 1) to the closed position TP (see FIG. 2), the engaging piece 114 moves in the direction of the arrow S3 and is received in the recessed receiving portion 116 as shown in FIG. 8. In this way, while the engaging piece 114 is being received in the recessed receiving portion 116, the engaging piece 114 comes in contact with the inclined surface 142 of the engaging claw 130. When the display housing 106 is further rotated to the closed position TP, the inclined surface 142 is pushed by the engaging piece 114 and thus the engaging claw 130 moves in the direction of the arrow S2 against the spring force of the first spring 134. Accordingly, the engaging piece 114 further moves in the direction of the arrow S3, that is, to a deep side (a lower side) of the recessed receiving portion 116. When the engaging piece 114 is inserted up to a predetermined position in the recessed receiving portion 116, the engaging claw 130 slides in the direction of the arrow S1 with the spring force of the first spring 134 and engages with the locking hole 114H as shown in FIG. 9.

In this state, since the limiting piece 148 is located at the limiting position GP, the holding box 132 does not move to the retracting position KP. Accordingly, the holding box 132 is not moved to the retracting position KP by the operation of the unlocking button 144 and the engaging claw 130 is held at the engagement position LP. That is, even when a user of the electronic device 102 performs no operation, a state in which unlocking of the locking member 128 by the unlocking button 144 can be limited is realized.

Since the display housing 106 can be held at the closed position TP, a state in which an operation on the input section 108 is not possible can be maintained.

On the other hand, when the lock body 124 is pulled out of the long hole 126 as shown in FIG. 3, the limiting piece 148 moves to the non-limiting position FP with the spring force of the third spring 158. In this state, as shown in FIG. 10, the holding box 132 can move to the retracting position KP against the spring force of the second spring 136 by pressing the unlocking button 144 in the direction of the arrow S2. The holding box 132 and the engaging claw 130 move in the direction of the arrow S2 and the engaging claw 130 moves out of the recessed receiving portion 116. That is, unlocking of the locking member 128 by the unlocking button 144 becomes possible.

When the engaging claw 130 moves out of the recessed receiving portion 116, the engaging claw 130 does not engage with the engaging piece 114 and thus the display housing 106 can be rotated to the open position HP. Since the display housing 106 located at the open position HP does not cover the input section 108, an operation to the input section 108 is possible.

In this embodiment, the locking member 128 includes the engaging claw 130 and the holding box 132 as described above. The engaging claw 130 is urged to the engagement position with the first spring 134 with respect to the holding box 132, and the holding box 132 is urged to the protruding position SP with the second spring 136 with respect to the input section housing 104. In this way, it is possible to realize a structure in which unlocking of the locking member 128 by the unlocking button 144 can be satisfactorily limited using a structure including the engaging claw 130, the holding box 132, the first spring 134, and the second spring 136.

The inclined surface 142 is provided in the engaging claw 130. When the engaging piece 114 further moves inward in the recessed receiving portion 116 (in the direction of the arrow S3) in a state in which it comes in contact with the inclined surface 142, the engaging claw 130 can be moved in the direction of the arrow S2. That is, since the engaging claw 130 can temporarily be retracted from the recessed receiving portion 116 and the engaging piece 114 can be received in the recessed receiving portion 116 with an operation of rotating the display housing 106 to the closed position TP, it is not necessary to perform an operation of locking the display housing 106 at the closed position TP and it is possible to enhance the operability.

The unlocking button 144 can move the engaging claw 130 along with the holding box 132 to the disengagement position NP against the spring force of the second spring 136 by pressing the holding box 132 with the contact portion 144B. That is, since movement of the unlocking button 144 acts directly on the locking member 128, the engaging claw 130 can be satisfactorily and efficiently moved to the disengagement position NP.

The unlocking button 144 includes the operation button portion 144A. Since the operation button portion 144A protrudes from the input section housing 104 and directly receives a pressing operation, it is possible to satisfactorily unlock the locking member 128.

The limiting piece 148 of the limiting member 146 limits movement of the holding box 132 to the retracting position KP by coming in contact with the holding box 132 from the direction of the arrow S2, that is, from the retracting position KP side. Since a limiting piece 148 comes in direct contact with the holding box 132, it is possible to satisfactorily limit movement of the holding box 132 to the retracting position KP.

The limiting member 146 has a structure in which the limiting piece 148 moves between the limiting position GP and the non-limiting position FP. That is, with a simple structure in which the limiting piece 148 moves between two positions, the locked state of the locking member 128 can be held. In the device-anchored state, the limiting piece 148 moves to the limiting position GP and thus it is possible to satisfactorily limit movement of the holding box 132 to the retracting position KP. In the device-non-anchored state, the limiting piece 148 moves to the non-limiting position FP and thus it is possible to realize a structure for causing the engaging claw 130 along with the holding box 132 to retract from the recessed receiving portion 116.

A second embodiment will be described below. In the second embodiment, the same elements, members, and the like as in the first embodiment will be referred to by the same reference signs and a detailed description thereof will not be repeated.

Figure 11:
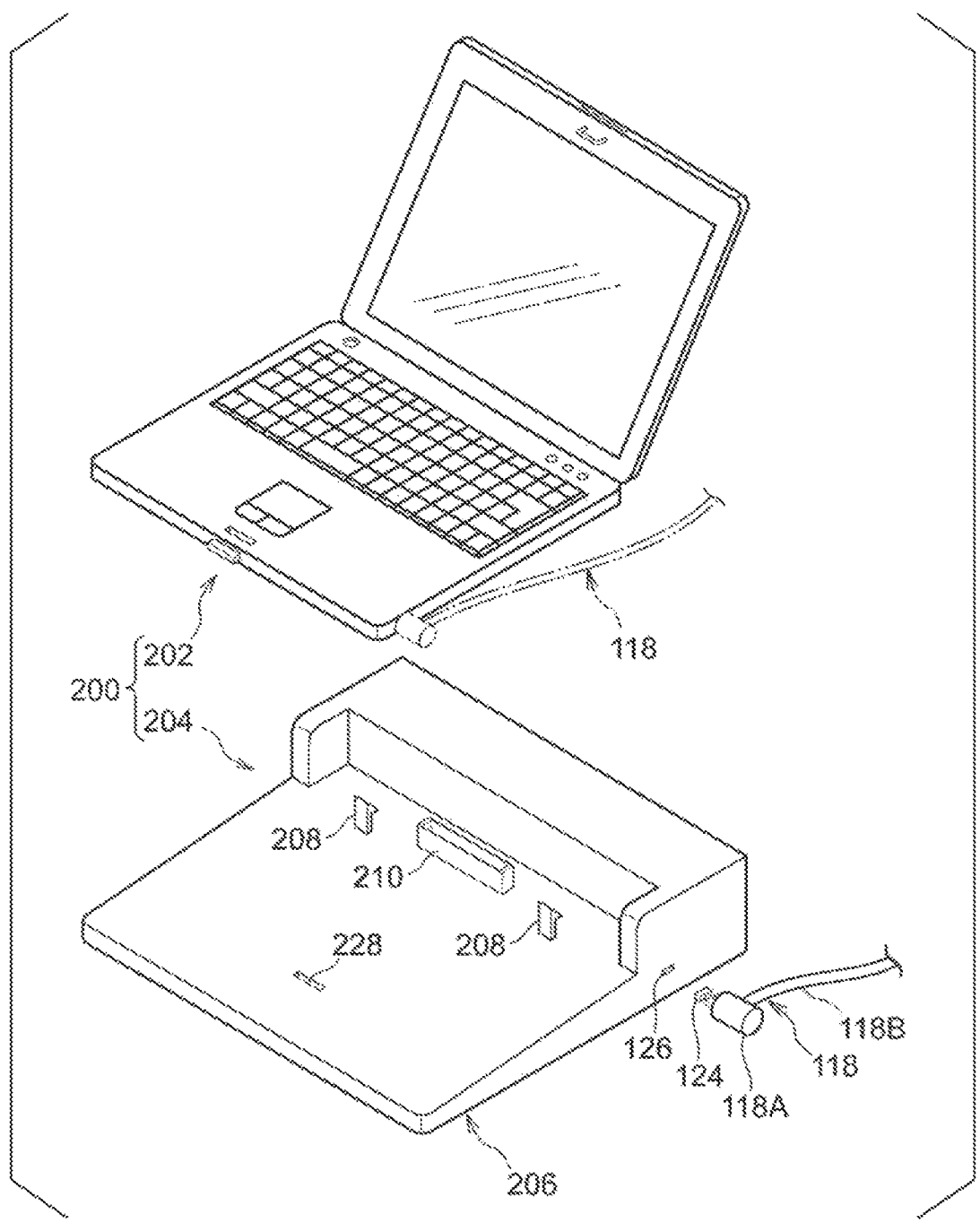
FIG. 11 is a perspective view showing an electronic system including a dock for an electronic device according to a second embodiment.

As shown in FIG. 11, the second embodiment relates to an electronic system 200 including an electronic device 202 and a dock for an electronic device 204.

The dock for an electronic device 204 includes a dock housing 206 in which the electronic device 202 is mounted. A fixing claw 208 is provided in the dock housing 206. When the electronic device 202 is attached to the dock housing 206 in a state in which the electronic device 202 is mounted, the fixing claw 208 engages a fixing portion (not shown) of the electronic device 202 and fixes the electronic device 202 to the dock housing 206.

A connector 210 that is electrically connected to the electronic device 202 which is fixed as described above is provided in the dock housing 206. Supply of electric power from the dock for an electronic device 204 to the electronic device 202 or input and output of various signals between the dock for an electronic device 204 and the electronic device 202 are possible through the connector 210. Various connection ports or extension connectors for connection to external devices are provided in the dock housing 206. The electronic device 202 can be used in a state in which it is not mounted in the dock for an electronic device 204 and can also be used in a state in which it is mounted therein.

As shown in FIGS. 14 to 18, a limiting member 212 is provided in the dock housing 206. The limiting member 212 includes a limiting piece 214, a link mechanism 216, and a fourth spring 218.

Figure 12:
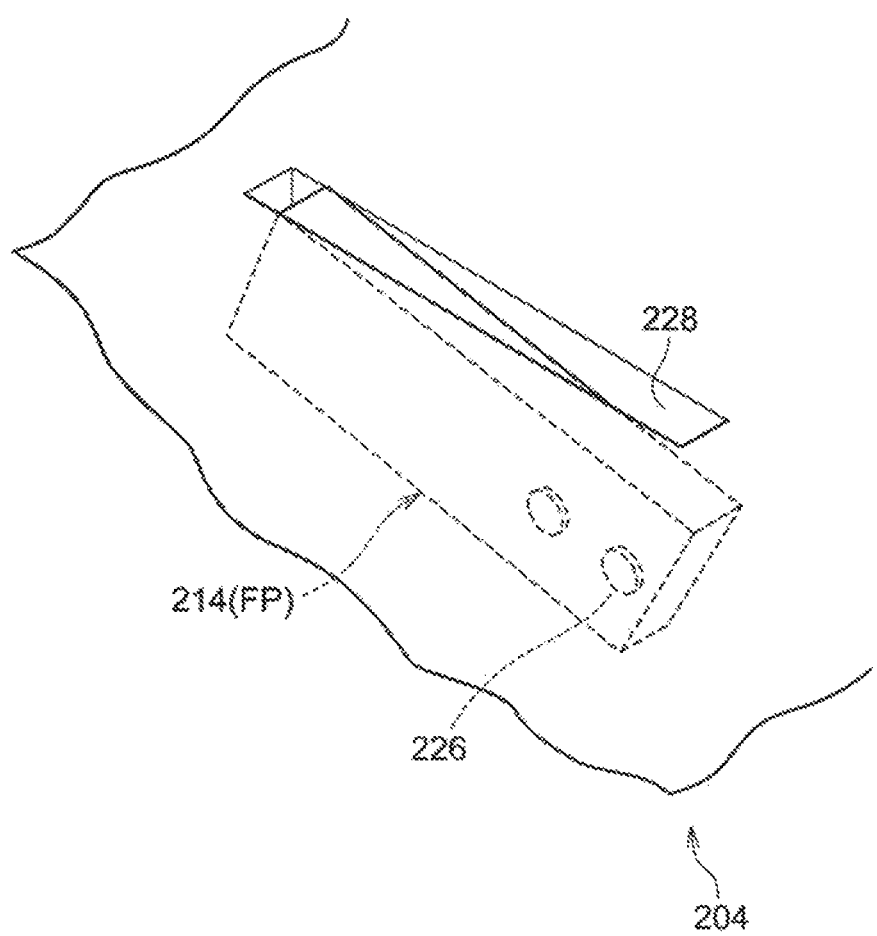
FIG. 12 is a partially enlarged perspective view showing the dock for an electronic device according to the second embodiment.
Figure 13:
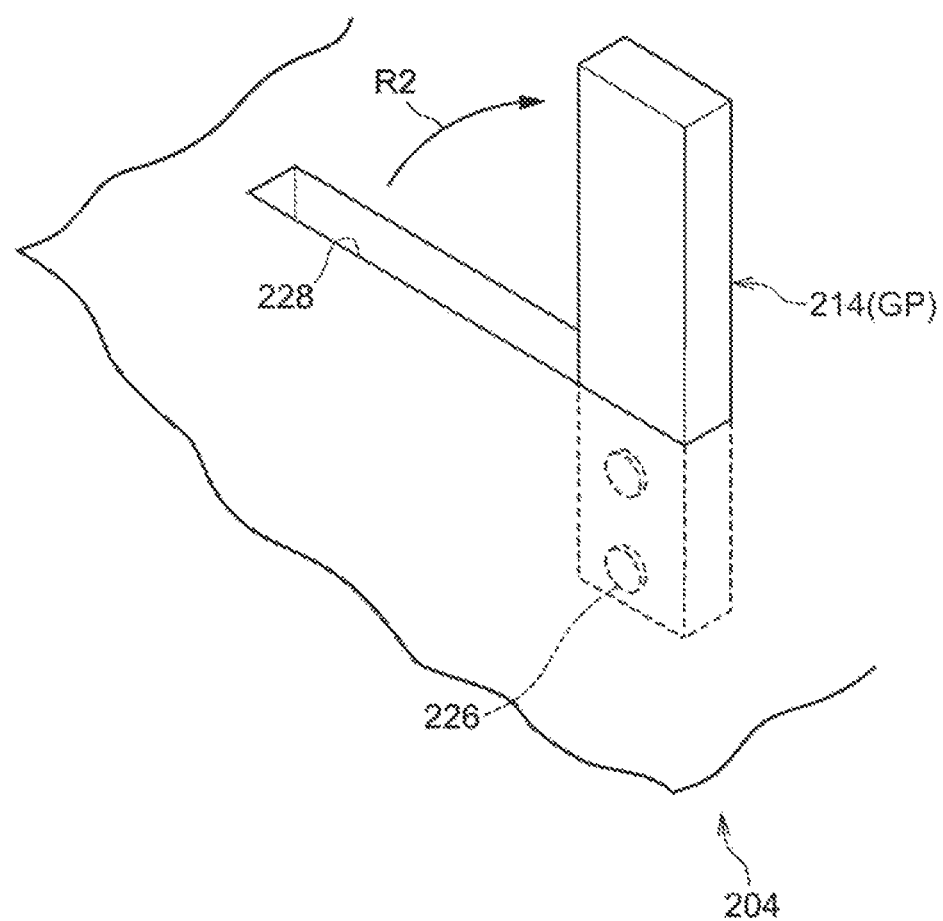
FIG. 13 is a partially enlarged perspective view showing the dock for an electronic device according to the second embodiment.

The limiting piece 214 is a long member and one end 214A is rotatably attached to a support shaft 226 of the dock housing 206. The limiting piece 214 rotates about the support shaft 226 and moves between a limiting position GP shown in FIG. 17 and a non-limiting position FP shown in FIG. 15. At the limiting position GP, the limiting piece 214 protrudes from a protrusion hole 228 formed in the top surface of the dock housing 206 as shown in FIG. 13. On the other hand, at the non-limiting position FP, the limiting piece 214 does not protrude from the protrusion hole 228 but is received in the dock housing 206 as shown in FIG. 12.

The link mechanism 216 includes a first link 220, a second link 222, and a third link 224. The link mechanism 216 is a mechanism that rotates the limiting piece 214 to the limiting position GP, that is, a position at which it protrudes from the protrusion hole 228 by inserting the lock body 124 of the wire lock member 118 into the long hole 126 as will be described later.

One end 220A of the first link 220 is held in the holder 156, and the other end 220B of the first link 220 is rotatably coupled to one end 222A of the second link 222.

An intermediate portion 222C of the second link 222 is rotatably supported by a rotation shaft 236 of the dock housing 206 and the other end 222B of the second link 222 is rotatably coupled to one end 224A of the third link 224.

The other end 224B of the third link 224 is rotatably coupled to the other end 214B side of the limiting piece 214 with respect to the support shaft 226. A spring force of the fourth spring 218 attached to the dock housing 206 acts in the direction of an arrow S6 on the other end 224B of the third link 224.

Figure 18:
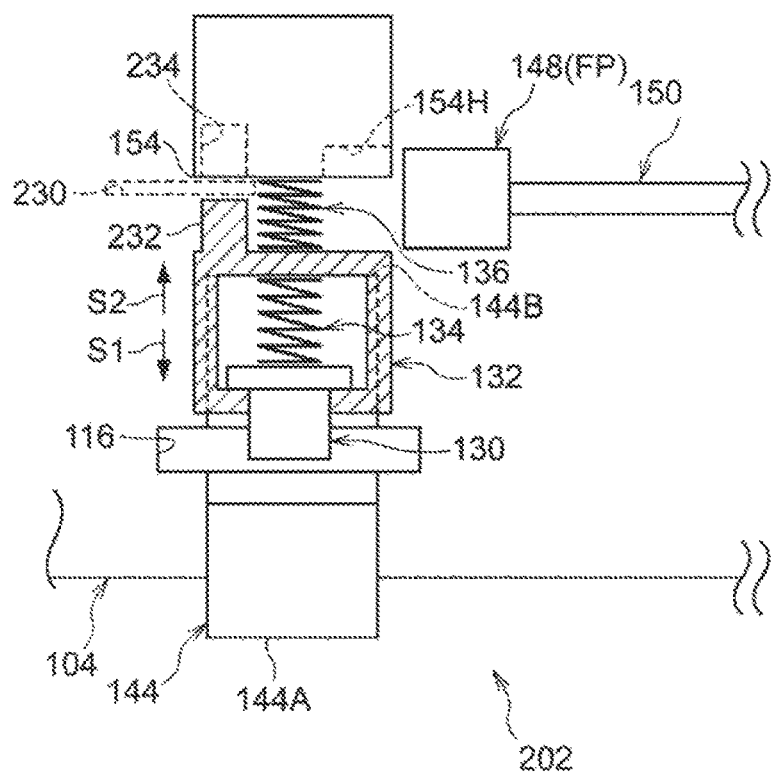
FIG. 18 is a partially exploded front view showing an internal structure of an electronic device according to the second embodiment.
Figure 19:
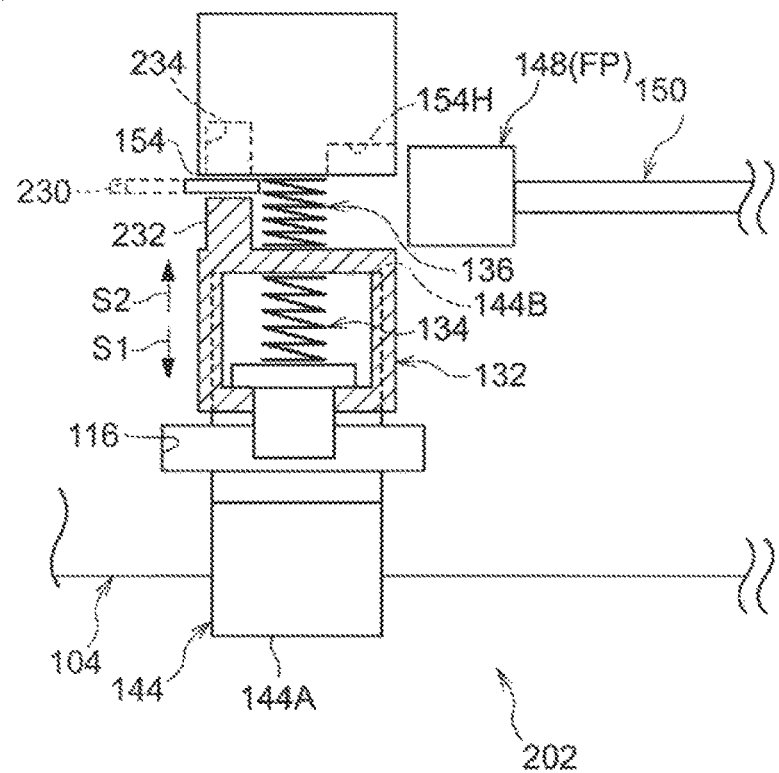
FIG. 19 is a partially exploded front view showing an internal structure of an electronic device according to the second embodiment.

In the second embodiment, electronic devices 202 having internal structures shown in FIGS. 18 and 19 can be applied as the electronic device which is mounted on the dock for an electronic device 204. Particularly, in consideration of mounting on the dock for an electronic device 204, a receiving hole 230 that receives the limiting piece 214 located at the limiting position GP is provided in the input section housing 104 of the electronic device 202. In the second embodiment, a protruding portion 232 that protrudes in the direction of the arrow S2 is formed in the holding box 132. The limiting piece 214 entering the input section housing 104 via the receiving hole 230 comes in contact with the protruding portion 232 provided in the holding box 132 of the electronic device 202 in the direction of the arrow S2. A recessed portion 234 in which the protruding portion 232 is received when the holding box 132 moves in the direction of the arrow S2 is formed in the inner wall 154 of the input section housing 104.

In the second embodiment, the lock body 124 of the wire lock member 118 can be inserted into the long hole 126 of the dock housing 206 in a state in which the electronic device 202 is fixed to the dock for an electronic device 204. In this state, the electronic device 202 and the dock for an electronic device 204 can be bound together by an external member to realize the device-anchored state. In the second embodiment, in the device-anchored state, the electronic device 202 and the dock for an electronic device 204 cannot be taken out of the anchoring place and it is thus possible to prevent theft of the electronic device 202 and the dock for an electronic device 204.

Figure 16:
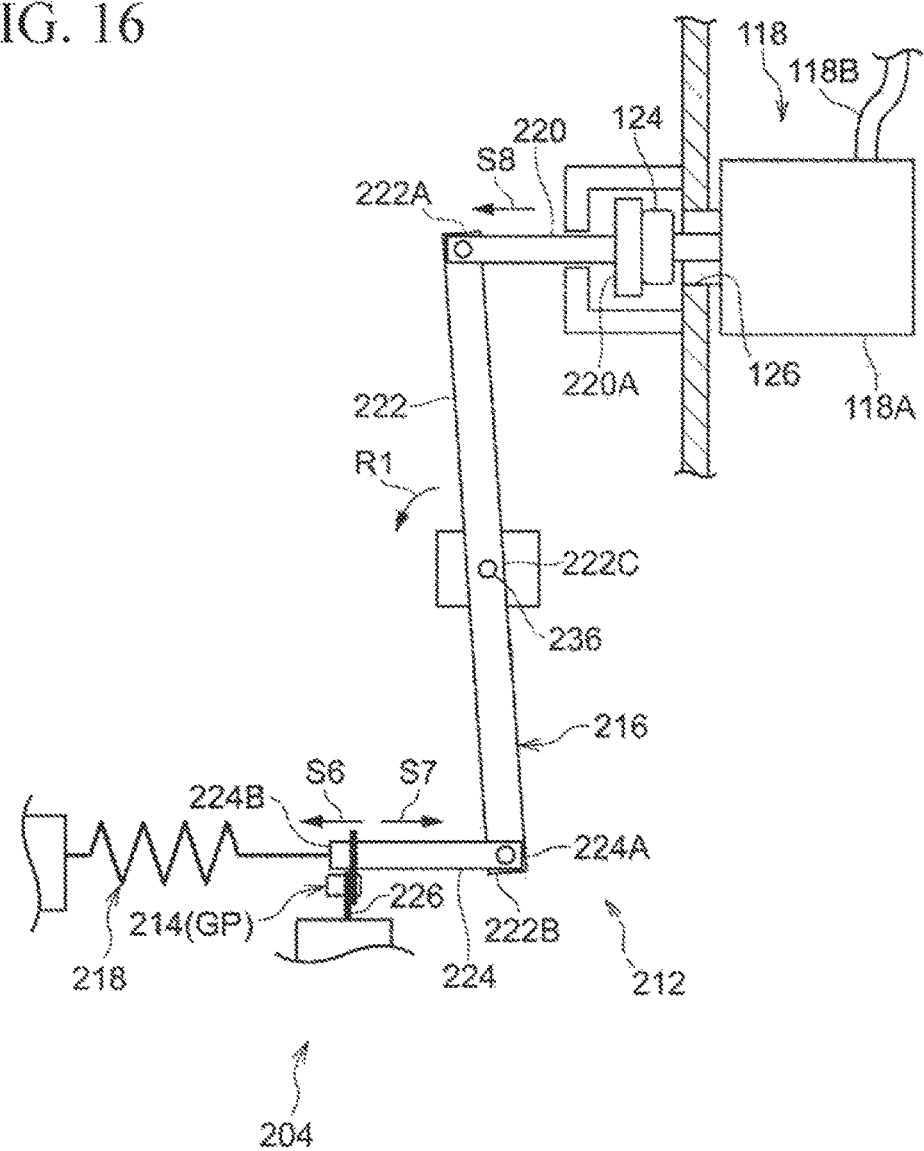
FIG. 16 is a plan view showing an internal structure of the dock for an electronic device according to the second embodiment.
Figure 17:
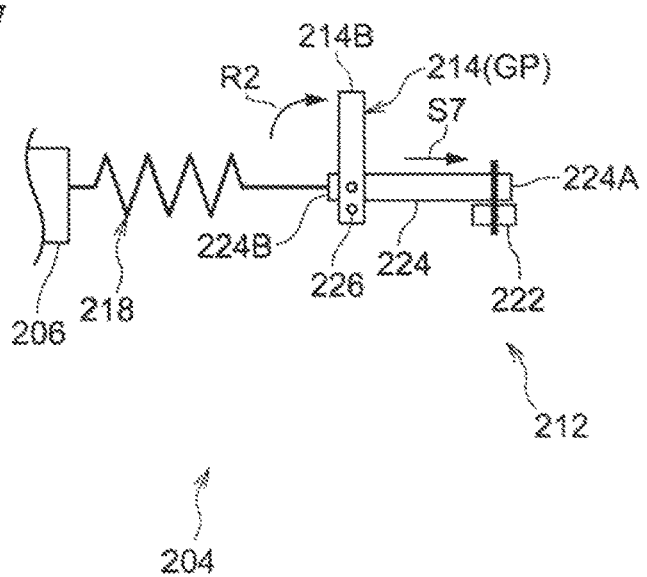
FIG. 17 is a front view showing an internal structure of the dock for an electronic device according to the second embodiment.

In the second embodiment, when the lock body 124 of the wire lock member 118 is inserted into the long hole 126 of the dock housing 206 as shown in FIGS. 16 and 17, the first link 220 is pushed in the direction of the arrow S8 by the lock body 124. Then, the second link 222 rotates in the direction of the arrow R1 against the spring force of the fourth spring 218 and the third link 224 moves in the direction of the arrow S7. Accordingly, the limiting piece 214 rotates in the direction of the arrow R2 and is located at the limiting position GP. That is, by using the link mechanism 216, the limiting piece 214 can be satisfactorily rotated to the limiting position GP by the lock body 124 of the wire lock member 118 inserted into the dock housing 206.

When the display housing 106 is rotated to the closed position TP (see FIG. 2), the engaging claw 130 is fitted into the locking hole 114H. In this state, the limiting piece 214 is located at the limiting position GP and thus the holding box 132 does not move to the retracting position KP. That is, the holding box 132 cannot be moved to the retracting position KP by an operation of the unlocking button 144. In this way, in the second embodiment, the engaging claw 130 is held at the engagement position LP and unlocking of the locking member 128 by the unlocking button 144 can be limited without an operation by a user of the electronic device 102.

Figure 14:
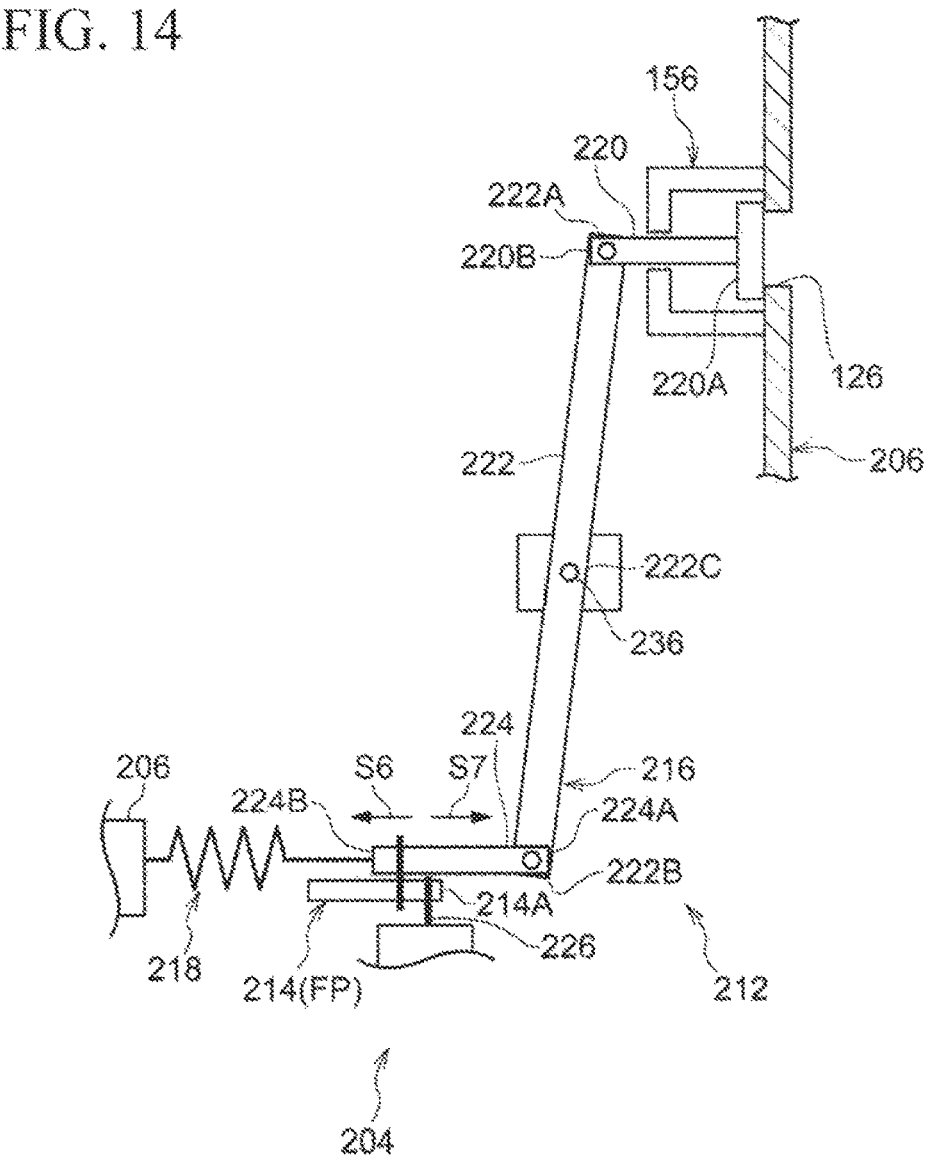
FIG. 14 is a plan view showing an internal structure of the dock for an electronic device according to the second embodiment.
Figure 15:
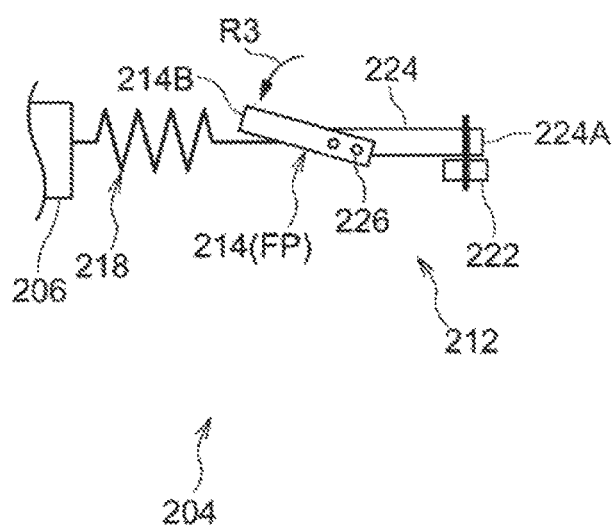
FIG. 15 is a front view showing an internal structure of the dock for an electronic device according to the second embodiment.

As shown in FIG. 14, when the lock body 214 is taken out of the long hole 126, the limiting piece 214 rotates in the direction of the arrow R3 by the spring force of the fourth spring 218 and moves to the non-limiting position FP. Accordingly, by pressing the unlocking button 144, the holding box 132 can be moved to the retracting position KP. Accordingly, by using the unlocking button 144, it is possible to move the holding box 132 in the direction of the arrow S2 and to move the engaging claw 130 to the disengagement position NP. In the state in which the engaging claw 130 is located in the disengagement position NP in this way, since the engaging claw 130 does not engage with the engaging piece 114 when it departs from the recessed receiving portion 116, the display housing 106 can be rotated to the open position HP.

In the second embodiment, the structure for moving the limiting piece 214 between the limiting position GP and the non-limiting position FP is not limited to the above-mentioned rotation, but may be, for example, sliding. For example, when the limiting piece 214 is held in the dock housing 206 such it can slide in a direction in which the length direction thereof is the thickness direction (the vertical direction) of the dock housing 206, a space for sliding is necessary and the thickness of the dock housing 206 increases. On the other hand, with a structure for moving the limiting piece 214 between the limiting position GP and the non-limiting position FP by rotation, the space for sliding is not necessary and it is thus possible to achieve a decrease in thickness of the dock housing 206.

A structure (a so-called notebook computer) in which the input section housing 104 and the display housing 106 are rotatably connected with the hinge 112 has been exemplified above as the electronic device, but the electronic device is not limited to the example. For example, a structure in which the input section housing and the display housing are not connected but are separate and the display housing is attached to the input section of the input section housing to cover it may be employed. In an electronic device including a cover (for example, a keyboard cover) covering the input section separately from the display housing, a structure using the cover as a lid member may be employed.

The input section housing 104 including the input section 108 has been exemplified above as an example of the second housing section, but a housing section not including the input section may be used as the second housing section.

While embodiments of the technology disclosed in the present application have been described above, the technology disclosed in the present application is not limited thereto and can be modified in various forms without departing from the gist thereof.

What is claimed is:

1. An electronic device comprising:
   a first housing section;
   a second housing section of which one side is rotatably connected to the first housing section;

a locking portion that is disposed in the first housing section and includes a recessed portion which is recessed in a first direction;

a locking member that is disposed in the second housing section, is movable between a first position and a second position, and is urged toward the second position; and a limiting member that is disposed in the second housing section, is configured to move between the first position and the second position with insertion of an anchoring member, and is configured to limit movement of the locking member from the second position to the first position, wherein the locking member includes:

an engaging member that is configured to move between an engagement position at which the engaging member engages with an engaging piece of the first housing section and a disengagement position at which the engaging member disengages from the engaging piece;

a holding member that holds the engaging member to be movable between the engagement position and the disengagement position and is configured to move between a protruding position at which the engaging member protrudes to the engagement position and a retracting position at which the engaging member retracts from the engagement position, a first urging member that is configured to urge the engaging member to the engagement position with respect to the holding member; and a second urging member that is configured to urge the holding member to the protruding position with respect to the second housing section.

2. The electronic device according to claim 1, further comprising an inclined surface that is disposed in the locking member and is configured to convert a pressing force from the engaging piece into a force toward the disengagement position when the engaging piece comes in contact with the inclined surface with movement of the first housing section.

3. The electronic device according to claim 1, further comprising an unlocking member that is configured to move the engaging member along with the holding member to the disengagement position by pressing the holding member to the retracting position against an urging force of the second urging member.

4. The electronic device according to claim 3, wherein the unlocking member includes an operation button portion that protrudes outward from the second housing section and is configured to receive a pressing operation.

5. The electronic device according to claim 1, wherein the limiting member is configured to limit the unlocking by limiting movement of the holding member to the retracting position.

6. The electronic device according to claim 4, wherein the limiting member is configured to move to a limiting position at which movement of the holding member to the retracting position is limited in a state in which the anchoring member is inserted.

7. The electronic device according to claim 6, wherein the limiting member is configured to move to a non-limiting position at which movement of the holding member to the retracting position is not limited in a state in which the anchoring member is not inserted.

8. A dock for an electronic device comprising:

a dock housing that includes a connection portion to which an electronic device is connected; and a limiting piece that is disposed in the dock housing, is configured to protrude from the dock housing with insertion of an anchoring member, and is configured to limit movement of a locking member of the electronic device from a second position to a first position, wherein the limiting piece is configured to move between a position at which the limiting piece is received in the dock housing and a position at which the limiting piece protrudes from the dock housing by rotation, and wherein the dock further comprises a link mechanism that is configured to rotate the limiting piece from the position at which the limiting piece is received in the dock housing to a position at which the limiting piece protrudes from the dock housing using the anchoring member inserted into the dock housing.

9. An electronic system comprising a first housing section;

a second housing section of which one side is rotatably connected to the first housing section;

a locking portion that is disposed in the first housing section and includes a recessed portion which is recessed in a first direction;

a locking member that is disposed in the second housing section, is movable between a first position and a second position, and is urged toward the second position;

a dock housing that includes a connection portion to which the second housing section is connected; and a limiting piece that is disposed in the dock housing, protrudes from the dock housing with insertion of an anchoring member, and is configured to limit movement of the locking member from the second position to the first position, wherein the limiting piece is configured to move between a position at which the limiting piece is received in the dock housing and a position at which the limiting piece protrudes from the dock housing by rotation, and wherein the electronic system further comprises a link mechanism that is configured to rotate the limiting piece from the position at which the limiting piece is received in the dock housing to a position at which the limiting piece protrudes from the dock housing using the anchoring member inserted into the dock housing.

* * * * *